United States Patent [19]

Corrigan

[11] Patent Number: 4,663,256

[45] Date of Patent: May 5, 1987

[54] NONSINTERED NICKEL ELECTRODE

[75] Inventor: Dennis A. Corrigan, Troy, Mich.

[73] Assignee: General Motors Corporation, Detroit, Mich.

[21] Appl. No.: 791,446

[22] Filed: Oct. 25, 1985

[51] Int. Cl.$^4$ ............................................. H01M 4/32
[52] U.S. Cl. ................................. 429/223; 204/290 R
[58] Field of Search .................. 429/223, 206; 204/49, 204/290 R, 56 R

[56] References Cited

U.S. PATENT DOCUMENTS

| | | | |
|---|---|---|---|
| 3,597,829 | 8/1971 | Wagner et al. ................. | 429/223 X |
| 3,790,454 | 2/1974 | Henderson et al. .................. | 204/49 |
| 4,170,536 | 10/1979 | Kawasaki et al. ................ | 204/49 X |
| 4,553,317 | 11/1985 | Nicolas et al. ..................... | 204/49 X |

OTHER PUBLICATIONS

V. Koudelka et al, Plastic-Bonded Electrodes for Nickel-Cadium Accumulators, V. Influence of the Current Collector and Mechanical Compression on the Current Carrying Capability of the Nickel Oxide Electrode, Journal of Power Sources, 6 (1981), 161-169.

J. Mrha et al, Plastic Bonded Electrodes for Nickel-Cadium Accumulators-II, Basic Electrochemical Parameters of the Nickel Oxide Electrode, Journal of Power Sources, 4 (1979) 239-250.

*Primary Examiner*—Anthony Skapars
*Attorney, Agent, or Firm*—Lawrence B. Plant

[57] ABSTRACT

A nonsintered NiOOH electrode for an alkaline battery including a plastic-bonded NiOOH active mass pressed onto a metallic substrate which has been previously coated with a layer of nickel dendrites to enhance the surface area of the substrate and promote adhesion of the active mass to the substrate.

2 Claims, 11 Drawing Figures

NONSINTERED NICKEL ELECTRODE

This invention relates to nonsintered nickel electrodes for alkaline batteries and more particularly to an improved substrate for the electrode's active material.

BACKGROUND OF THE INVENTION

Nickel electrodes for alkaline batteries fall primarily into one of two categories, i.e. sintered or nonsintered. Sintered electrodes typically employ porous, sintered nickel plaques electrochemically impregnated with nickel hydroxide and have demonstrated excellent peak power retention after repeated cycling. Nonsintered nickel electrodes (often called plastic-bonded electrodes) are made by pressing a mass of active material onto a conductive substrate (e.g., expanded metal, wire mesh, foils, etc., made from copper, nickel, iron, etc.) and, compared to sintered electrodes, have generally poor peak power retention after cycling. In nonsintered, plastic-bonded electrodes, the active material mixture typically comprises: nickel hydroxide as the electrochemically active material; conductive diluent (e.g., nickel or graphite particles) distributed throughout the nickel hydroxide for imparting conductivity to the mass; cobalt hydroxide to improve the charge efficiency of the electrode; and a plastic binder (e.g., styrene, PTFE, etc.) for holding the active material and diluent together onto the conductive substrate. More specifically, these active material masses optimally contain about 20% to about 25% percent by weight of graphite as the conductive diluent in particles which range in size up to about ten microns. Lower conductive diluent loadings generally tend to reduce the conductivity and power performance of the active material while greater diluent loadings unnecessarily consume space otherwise available for the active nickel hydroxide without any significant offsetting benefit. The binder content of the active mass can vary from about 1 to about 10 percent by weight of the active mass depending on the particular binder chosen. A PTFE binder content, for example, of about three to about five percent by weight is not unusual. Most manufacturers also include a small amount of cobalt hydroxide (i.e., equal to about five percent of the nickel present) to improve charging of the electrode.

The active mass of the nonsintered electrodes is pressed (e.g., by rolling) onto a metallic substrate (e.g., nickel or nickel plated copper) which serves not only to support the active material relative to the battery's counterelectrode but also as the primary current collector for the electrode. This conductive substrate can take many forms such as expanded metal, stabbed foil (i.e., a punctured sheet with puncture tears projecting from both sides thereof), open-cell foam metal, etc.

Nonsintered plastic-bonded nickel electrodes are more economical to produce than their sintered counterparts and offer the distinct advantage of utilizing manufacturing techniques and equipment quite similar to those commonly used for pasting Pb-acid battery plates. However, nonsintered electrodes have not achieved the same power performance levels as the sintered electrodes. In this regard, nonsintered nickel electrodes typically have a lower initial peak power than sintered electrodes and, unlike sintered electrodes, their peak power (e.g. at 50% depth of discharge-DOD) fades quite rapidly upon repeated cycling. One of the major causes of this power fade in nonsintered nickel electrodes is believed to be the interfacial resistance that exists between the active material mass and the substrate which resistance increases dramatically with repeated cycling. Untoward interfacial resistance increase upon repeated cycling is believed to be associated with: low interfacial contact between the active material and the surface of the substrate; loss of adhesion between the active material and the substrate; and the formation of an resistive oxide film on the surface of the substrate.

Heretofore, others have observed that the performance of nonsintered electrodes improves as the roughness of the substrate's surface increases. For example, V. Koudelka et. al., *Plastic-Bonded Electrodes for Nickel-Cadmium Accumulators. V. Influence of the Current Collector and Mechanical Compression on the Current Carrying Capability of the Nickel Oxide Electrode*, Journal of Power Sources, 6 (1981), 161-169 noted that a "metallized" (e.g., sprayed) nickel surface was superior to an electroplated nickel surface. Moreover, others have provided roughened substrate surfaces by electrolytically codepositing nickel and graphite onto the substrate. These latter coatings, sometimes referred to as "codep" coatings, have proved more effective than other earlier used electrodeposits (e.g., bright, semi-bright, or mat nickel deposits) in improving the power performance of nonsintered nickel electrodes. Codep coatings however are quite expensive to produce, difficult to control on a production basis and have a roughness which is essentially dependent on the particle size of the conductive inclusions.

Accordingly, it is an object of the present invention to provide a nonsintered nickel electrode having a power performance at least substantially comparable to electrodes made with codep coated substrates but which can be manufactured more readily, economically and consistently, and whose properties can be varied simply by varying easily controllable plating parameters such as time, temperature, concentration and current density. This and other objects and advantages of the present invention will become more readily apparent from the detailed description thereof which follows.

BRIEF DESCRIPTION OF THE INVENTION

The present invention comprehends an alkaline battery including a plastic-bonded nonsintered nickel electrode characterized by an electrically conductive substrate (e.g., nickel, copper, etc.) having a layer of electrodeposited nickel dendrites adhering firmly to the surface thereof. The dendrite size and population is such that the active material mass penetrates the plated surface so that the dendrites project into the active mass so as to substantially increase (i.e., at least double) the effective surface area of the substrate in contact with the active mass and to mechanically anchor the mass against premature separation from the substrate while in use. Increasing the surface area of the substrate in contact with the active material reduces the interfacial resistance therebetween. Mechanically keying the mass to the substrate enhances adhesion of the active mass to the substrate and thereby extends the useful life of the electrode.

To insure adequate penetration of the plated surface by the active material, the dendrites will have a population on the surface of the substrate wherein they are spaced one from the other by a distance which is greater than the average diameter of the conductive diluent particles in the active material mass so that the conductive diluent particles will enter the interdendrite space and contact the sides of the dendrite. This interdendrite space will preferably be several times (but generally less than about ten times) the diameter of the conductive particles for the most effective contact with the dendrites. In this regard, when the interdendrite spacing is less than the size of the conductive diluent the diluent can not enter the interdendrite space and contact the additional surface provided by the sidewalls of the dendrites. In the same vein, when the interdentrite spacing is too large, not only is the effective surface area of the substrate reduced but the additional active material which may now enter the space has little or no better conductive relationship with the dendrites than does the active mass immediately outboard the dendritic surface—hence contributing little to reducing the interfacial resistance. Dendrites in accordance with the present invention will preferably have a population of about $10^4/cm^2$ to about $10^7/cm^2$, an aspect ratio (i.e., height/average width) of at least about 2 to about 10 and be such as to at least double (preferably ten times) the effective surface area of the current collector in contact with the active mass and to insure relatively deep penetration into the active mass. In this latter regard, when the aspect ratio is below about 2 there is very little penetration of the active mass and when it exceeds about 10, the dendrites tend to be quite fragile and are more readily susceptible to breaking off from the surface rather than adhering firmly thereto as is required for anchoring the active mass to the substrate and reducing the electrical resistance at the interface between the substrate and the active mass. The dendrites will preferably have an average girth of about one to about nine times the interdendrite spacing to insure that each has a sufficiently large surface area for contact with the active mass. The increased surface area of contact between the substrate and the active material and improved adhesion of the active mass to the substrate provided by the dendritic nickel coating of the present invention results in enhanced power performance of nickel electrodes provided therewith. As an added benefit, I have found that electrodes made with dendritic nickel have a much lesser dependence on electrode stack compression in order to achieve good power output than cells made with other substrate coatings.

The dendritic nickel coating of the present invention may be electrodeposited onto the surface of the substrate by substantially any of the well known techniques for forming such deposits. For example, a low temperature, quiescent nickel strike bath containing impurity levels of copper and operated at high current densities has been successfully used to plate highly effective (i.e., power-wise) current collectors. Unfortunately, the copper impurities ultimately contaminated the test cells. Accordingly, I prefer to use the electrolytes and plating parameters used for the formation of electrolytic nickel powders. In this regard, such electrolytes and plating conditions as the following may be used:

| Electrolyte A | $NiSO_4.7H_2O$ | 20 g/l |
|---|---|---|
| | $(NH_4)_2SO_4$ | 20 g/l |
| | NaCl | 10 g/l |
| | pH | 4–4.5 |
| | Current Density | 5 amp/dm$^2$ |
| | Temperature | 30–35° C. |
| Electrolyte B | $NiCl_2$ | 9–18 g/l |
| | $NH_4Cl$ | 20 g/l |
| | NaCl | 10 g/l |
| | pH | 5.5–6.5 |
| | Current Density | 30–60 amp/dm$^2$ |
| Electrolyte C | Ni (as $NiSO_4.7H_2O$) | 20 g/l |
| | $NH_4Cl$ | 40 g/l |
| | NaCl | 25 g/l |
| | Temp | 25° C. |
| | pH | 5 |
| | Current Density | 200 mA/cm$^2$ |
| | Time | 5 min |

Other electrolytes may also be useful depending on how they are used. In this regard, the electrolysis conditions which favor the formation of dendritic electrodeposits include: (1) low metal ion concentrations, (2) high concentrations of inert electrolytes (e.g., NaCl), (3) quiescent electrolytes, (4) high current densities, (5) low temperatures and (6) long deposition times.

When copper is used as the substrate, I prefer to first coat the substrate with a continuous layer of smooth nickel (e.g., sulfamate nickel) before depositing the dendritic layer to insure that the copper is completely coated with nickel to protect it from the alkaline electrolyte. Finally, I prefer that the substrate underlying the dendritic nickel layer have a roughened surface before depositing the dendritic nickel layer. In this regard, a roughened substrate promotes better nucleation of the dendrites during the plating sequence. Hence it is desirable to sand or grit blast smooth copper surfaces before plating.

DETAILED DESCRIPTION OF SPECIFIC EMBODIMENTS AND TESTS

Dendritic nickel current collectors were incorporated into full-sized NiOOH electrodes and tested in tri-electrode Cd/NiOOH cells. The power performance of the NiOOH electrodes was monitored by pulse power tests for over 100 cycles. The results were compared to similar tests on current collectors plated with sulfamate nickel (i.e., the roughest of the smooth nickels), semi-bright nickel, bright nickel, electroless nickel and codep nickel and showed:

1. the power performance of semi-bright and sulfamate nickel was about the same;

2. the power performance of bright and electroless nickel was poor in comparison to sulfamate nickel; and,
3. the best performance was observed with current collectors plated with codep and dendritic nickel.

More specifically, NiOOH electrodes were prepared with current collectors comprising electroformed copper foil about 0.011 cm thick and 16 cm wide by 16 cm tall. The foils were placed in a stabbing die and stabbed with 1024 holes, 1.5 mm in diameter and 0.5 cm apart. Adjacent holes were punched from opposite sides and the stabbed foil pressed to a uniform thickness of 0.076 cm. Some of the stabbed foils were coated with sulfamate nickel under the following conditions:

| | |
|---|---|
| Ni | 75 g/l |
| Ni(NH$_2$SO$_3$)$_2$ | 450 g/l |
| NiCl$_2$.3½H$_2$O | 4 g/l |
| H$_3$BO$_3$ | 45 g/l |
| SNAP (wetting agent) | 0.4 g/l |
| pH | 3.5–4 |
| Temp. | 55° C. |
| Cur. Den. | 12 mA/cm$^2$ |
| Time | 45 min |
| Agitation | mechanical | and used as controls against which the dendritic nickel coated substrates were compared. Other stabbed foils were coated with different populations of dendritic nickel as follows:

| | |
|---|---|
| Ni | 60 g/l |
| NiCl$_2$.3½H$_2$O | 240 g/l |
| HCl | 55 g/l |
| Cu | 30 ppm |
| pH | <1 |
| Temp | 25° C. |
| Agitation | none |
| Voltage: | |
| Sample A | 5 |
| Sample B | 14 |
| Sample C | 5 |
| Sample D | 5 |
| Current Density: | |
| Sample A | 50 mA/cm$^2$ |
| Sample B | 250 mA/cm$^2$ |
| Sample C | 50 mA/cm$^2$ |
| Sample D | 50 mA/cm$^2$ |
| Time | |
| Sample A | 30 min |
| Sample B | 10 min |
| Sample C | 30 min |
| Sample D | 30 min |

Figure 4:
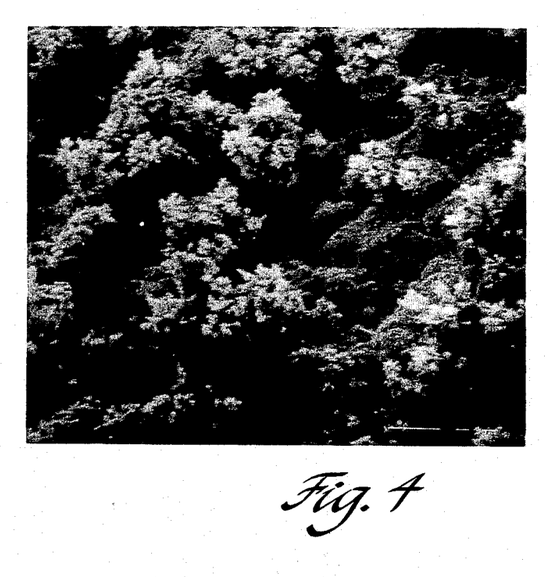
FIG. 4 is a Scanning Electron Micrograph (1000×) of a dendritic nickel electrodeposit on the mat side of an electroformed copper surface.

The resulting deposit formed on sample A is shown in FIG. 4 and had a dendrite population of about $2 \times 10^5$ dendrites/cm$^2$. The resulting deposit formed on sample B had a lower dendrite population somewhere less than $10^5$ dendrites/cm$^2$.

Figure 1:
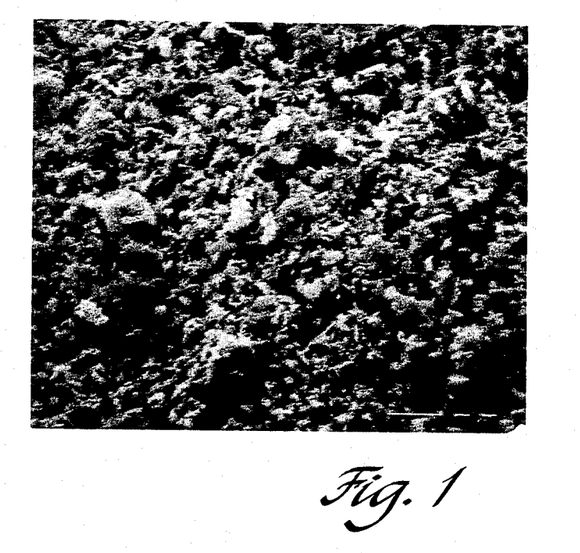
FIG. 1 is a Scanning Electron Micrograph (1000×) of a Ni-C codep deposit on the shiny side of an electroformed copper surface.
Figure 2:
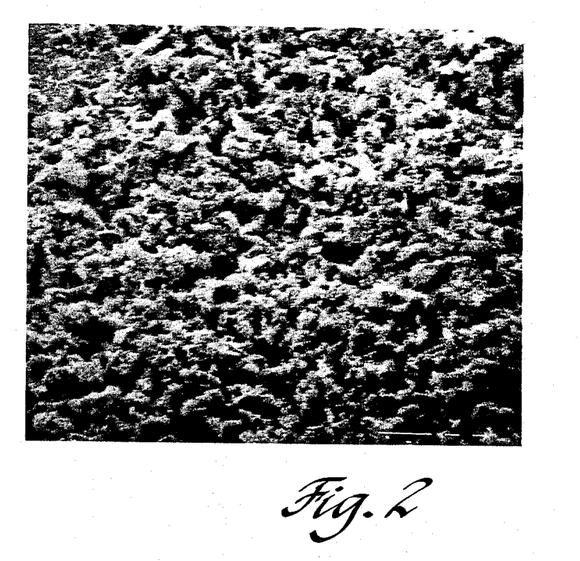
FIG. 2 is a Scanning Electron Micrograph (1000×) of a Ni-C codep deposit on the mat (i.e., rough) side of an electroformed copper surface.
Figure 3:
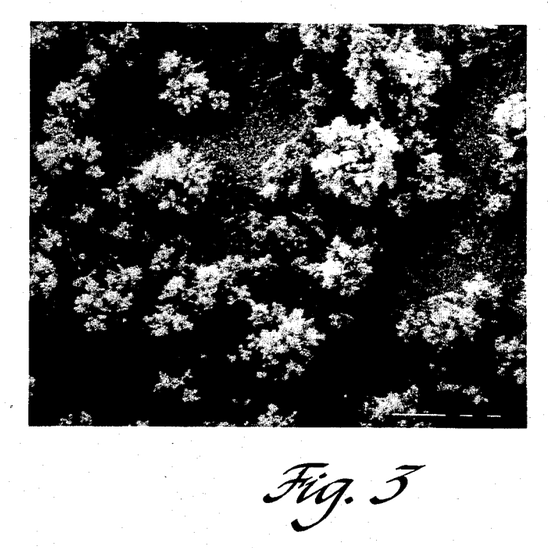
FIG. 3 is a Scanning Electron Micrograph (1000×) of a dendritic nickel electrodeposit on the shiny side of an electroformed copper surface.

A codep nickel coated stabbed foil sample was also prepared as a control and reference for comparison to the dendritic nickel coated substrates. The codep nickel deposit was plated from an optimized proprietary plating bath so as to codeposit a layer of graphite and electrolytic nickel (i.e., ca. 7% by wt graphite) on the surface of the current collector and is shown in FIGS. 1 and 2. The codep layer was covered with a layer of graphite held in a styrene binder (i.e., about 12.5 wt %) to make contact with the graphite in the codep layer and to provide an oxidation-resistant bridge to the active mass.

The sulfamate nickel coating appeared dull gray and had a thickness of about 13 micrometers for about 4 g of deposit whereas the dendritic nickels appeared dark gray to black with a perceptibly rough surface having an average thickness of about 38 micrometers for an average of about 2 g of deposit (e.g., see FIGS. 3, 4, 6, 7, 8 & 9). The codep nickel was black to the eye, rough to the touch (e.g., see FIGS. 1 & 2) and had an average thickness of about 25 micrometers for about 3 g of deposit.

The nickel coated current collectors were then each pasted with a NiOOH active mass comprising:

| | |
|---|---|
| nickel hydroxide | 62.9 wt % |
| cobalt hydroxide | 3.3 wt % |
| graphite (2 micron) | 22.0 wt % |
| carbon fibers | 5.9 wt % |
| PTFE | 5.9 wt % | to a thickness of about 0.18 cm and a capacity of about 12 AH.

The several NiOOH electrodes were tested in tri-electrode Cd/NiOOH cells consisting of one NiOOH positive electrode sandwiched between two sintered cadmium negative electrodes of commercial design (i.e., General Electric Catalogue #XCO2). The Cd electrodes each had a capacity of about 12 AH so that the cells were positive limited with a stoichiometric ratio of about two. The positive and negative electrodes were each wrapped with one turn of Pellon 2501 (i.e., nonwoven polyamide) separator and stacked into full-sized cell cases. Plexiglas shims were used to press the electrode stack together to about 90% of its uncompressed width. The cells were filled with 200 ml of 25 wt % KOH (which completely submerged the electrode stack) and tested in a fully vented condition. The cells were allowed to soak for one day and then formed by: charging at C/10 rate for 20 hours; discharging at C/3 rate to a 0.02 volt cutoff; short overnight to 0 volts; and charge at C/6 rate for 6 hours. Thereafter, the normal charge-discharge cycling regimen was begun (i.e., starting with a charge) wherein the cell was charged at C/6 rate for 6 hours and discharged at C/3 rate to a cutoff of 0.60 volts. A 30 minute open circuit rest period was provided after each charge and discharge. The power performance of the NiOOH electrode was characterized by the peak power output at 50% depth of discharge (i.e., DOD) as determined by pulse power tests. In this regard, the cell was discharged for 90 minutes at the C/3 rate (i.e., to 50% DOD based on the theoretical capacity). After a 15 minute open circuit period, a 60 amp discharge pulse was drawn. Voltage measurements were taken before and at the end of the pulse. Before peak power calculations were made, the results were adjusted by adding 0.4 volts to each measured Cd/NiOOH voltage in order estimate the power outputs the NiOOH electrodes would have if they had been incorporated into a Zn/NiOOH cell instead of a Cd/NiOOH. Peak power outputs were calculated from the adjusted voltage measurements according to:

$$P_{max} = E^2 I / 4(E-V)$$

where E is the open circuit voltage before the pulse, I is the discharge current during the pulse, and V is the final voltage at the end of the 20 second pulse.

Figure 10:
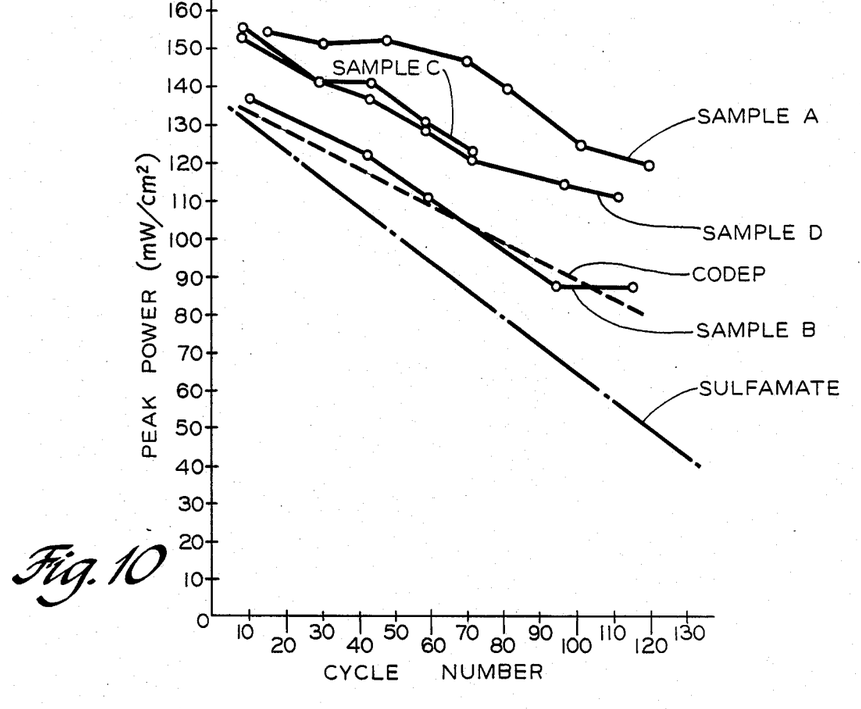
FIG. 10 is a plot of the results of several tests made with Ni-Cd cells.

FIG. 10 shows the results of those tests including the performance plots for the sulfamate and codep nickel control electrodes (i.e., best fit, straight line) and the actual data points for the several dendritic nickel electrodes (i.e., samples A–D). More specifically, FIG. 10 shows the superiority of the dendritic nickel electrode samples A, C & D to both the sulfamate and codep control electrodes and the substantial equivalency of the sample B dendritic nickel electrode to the codep control electrode.

In addition, dendritic nickel plated NiOOH electrodes, like those tested in the Cd/NiOOH cells, were also tested in zinc/nickel oxide cells. The Zn/NiOOH cells comprised two NiOOH electrodes and three zinc electrodes. The NiOOH electrodes were each wrapped with one layer of Pellon 2501 while the zinc electrodes were each wrapped with three layers of Celgard 3401 (i.e., microporous polypropylene). The zinc electrodes were prepared from a proprietary mix comprising essentially ZnO in a PTFE binder on an expanded metal grid yielding electrodes having a nominal capacity of about 22 AH. Hence, the test cells were limited by the positive electrode (i.e., NiOOH), had a theoretical capacity of about 25 AH, and a stoichiometric ratio of about 2.6.

The copper foil current collectors used in the Ni-Zn battery tests were all plated with a continuous underlayer (i.e., 0.001 cm thick) of sulfamate nickel prior to depositing the dendritic Ni layer. The continuous underlayer of sulfamate Ni insures complete protection of the copper from the alkaline electrolyte and thereby insures that there will be no copper contamination of the cell in the event the dendritic layer did not provide a continuous coating. Thereafter the dendritic Ni layers were deposited from an ammoniacal plating bath. More specifically, sample F was plated with 3.7 g of nickel as follows:

| Ni (as NiSO$_4$) | 9 g/l |
|---|---|
| NH$_4$Cl | 18 g/l |
| NaCl | 14 g/l |
| pH | 5–6 |
| Cur. Den. | 100 mA/cm$_2$ |
| Time | 5 min. |
| Temp | ambient |
| Agitation | none |

Figures 6, 7:
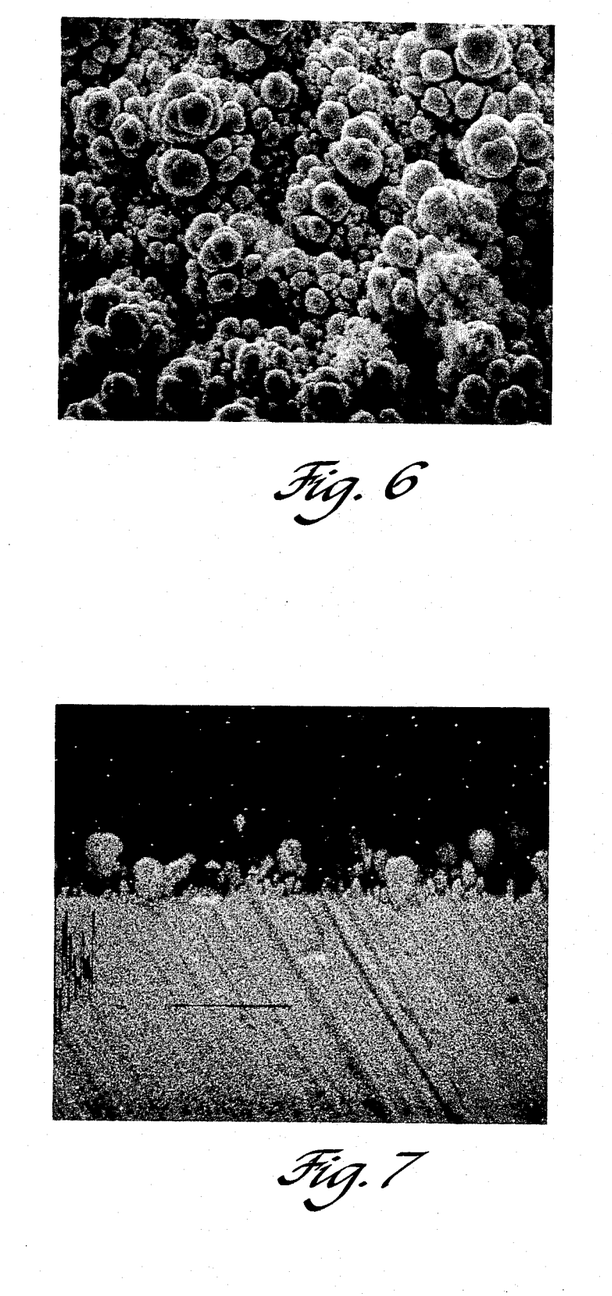
FIGS. 6 and 7 are Scanning Electron Micrographs (i.e., normal to and transverse) of the surface of test sample F.

The dendritic nickel deposit formed thereby is shown in FIGS. 6 and 7 and represents a dendrite population of about $7 \times 10^5$ dendrites/cm$^2$.

Sample E, on the other hand, was plated with 6.2 g of nickel as follows:

| Ni (as NiSO$_4$) | 18.5 g/l |
|---|---|
| NH$_4$Cl | 37 g/l |
| NaCl | 28 g/l |
| pH | 5–6 |
| Cur. Den. | 150 mA/cm$_2$ |
| Time | 5 min. |
| Temp. | ambient |
| Agitation | none |

Figure 8:
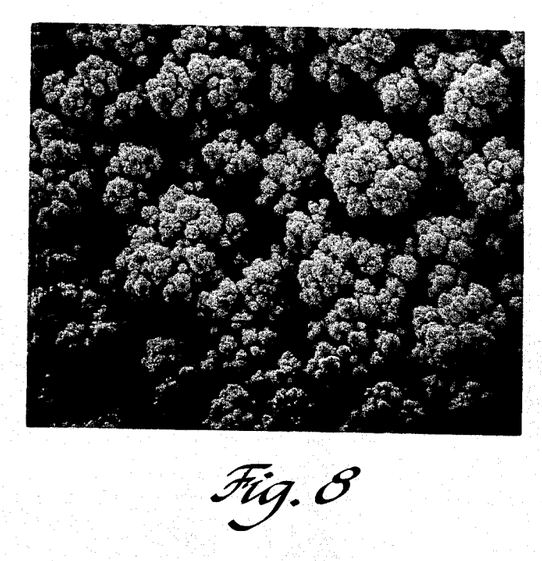
FIGS. 8 and 9 are Scanning Electron Micrographs (i.e., normal to and transverse) of the surface of test sample E.
Figure 9:
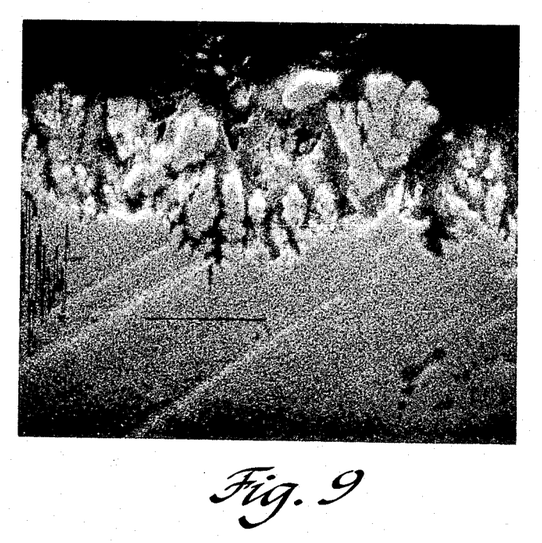

The dendritic nickel deposit formed thereby is shown in FIGS. 8 and 9 and represents a dendrite population of about $2 \times 10^6$ dendrites/cm$^2$.

The Zn/NiOOH cells were filled under vacuum with about 200 ml of 25% by wt KOH electrolyte, allowed to soak in this condition for three days and, after formation, operated in a flooded/vented condition. The cells were formed by: charging at 2 amps for 20 hrs.; discharging at 6 amps to 0 volts; shorting overnight; and finally charging at 2 amps for 20 hrs. Thereafter the normal charge-discharge cycling regimen was begun starting with a discharge at 6 amps to 1 volt and then recharging at 3.5 amps for 6 hrs. A 5 to 10 minute open circuit rest period was allowed after each charge and discharge.

Figure 11:
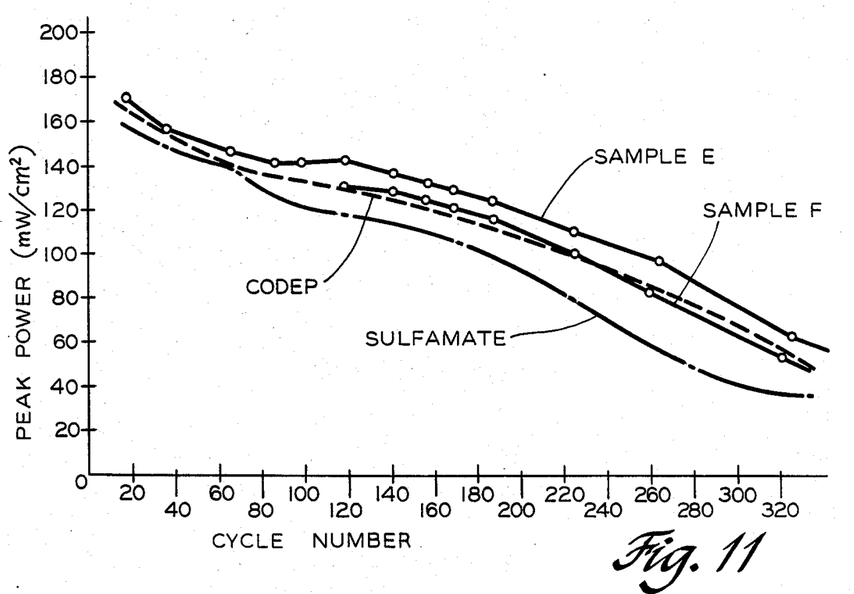
FIG. 11 is a plot of the results of several tests made with Ni-Zn cells.

The power performance of the Zn/NiOOH cells was characterized by the peak power output at 50% depth of discharge as determined by a pulse power test wherein after charging the cell was discharged for 90 mins. at a 6 amp rate and then allowed to rest at open circuit for 30 mins. Thereafter a 120 amp pulse was discharged from the cell for 20 secs. and the peak power calculated using the same formula as is set forth above for calculating the power of the Cd/NiOOH cells. The results of these tests and the favorable performance of the dendritic nickel electrodes are shown in FIG. 11. More specifically, FIG. 11 shows best fit curves for the codep nickel control electrode and for the average of two sulfamate nickel control electrodes verses the actual data points for two dendritic nickel samples (i.e., E & F). FIG. 11 shows that sample E is superior to both the sulfamate and codep nickel control electrodes and that sample F is superior to the sulfamate control electrode and equivalent to the codep control electrode.

Other Ni-Zn battery tests conducted with lower dendrite populations showed no significant improvement over the reference cells having smooth nickel current collectors under the specific conditions of those tests. These tests indicate that, under these test conditions, higher dendrite populations are required for Ni-Zn batteries than for Ni-Cd batteries before the benefits of the invention are perceptible on the basis of a full cell test. This finding confirms other work that suggests that there are other more powerful factors (e.g., stack compression, zincate ion influence, etc.) which affect the overall power performance of Ni-Zn cells and tend to mask the improvements contributed solely by the nickel electrode except at all but the higher dendrite populations. Individual electrode tests (i.e., directly against a reference electrode) are expected to demonstrate the improved power performance of the dendritic coatings in Ni-Zn cells even at lower dendrite populations.

Figure 5:
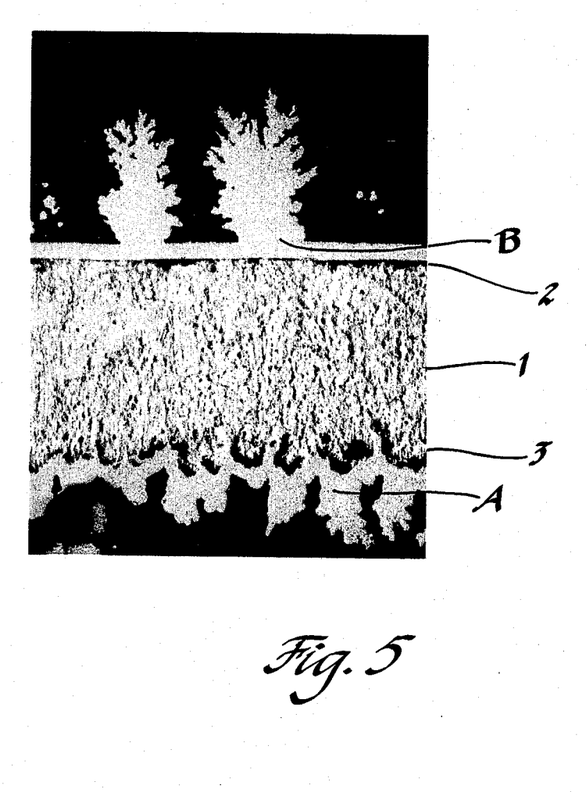
FIG. 5 is a Scanning Electron Micrograph (500×) taken transverse an electroformed copper foil plated on both sides (i.e., shiny upper and mat lower) with dendritic nickel.

FIGS. 5, 7 and 9 show the arboreal character of nickel dendrites in accordance with the present invention and FIGS. 4 (i.e., vs. FIG. 3) and 5 (i.e., bottom vs. top) demonstrate the affects of a pre-roughened substrate on the character and population of the dendrites formed under a particular set of conditions. FIG. 5, for example, is a scanning electron micrograph (500×) of a section taken through an electroformed foil substrate 1 plated concurrently on both sides in the same electrolyte for 30 mins. at 400 mA/cm$^2$. The topside 2 of the foil 1 was formed against the electroforming mandrel and accordingly has a highly polished (i.e., shiny) surface. The bottom side 3 of the foil on the other hand is quite rough as a result of the electroforming process. As can readily be seen, the dendritic nickel layer A formed on the rougher bottom side 3 of the foil has a much higher population of dendrites than the dendritic layer B formed on the smoother upper side 2 of the foil 1.

While the invention has been disclosed primarily in terms of specific embodiments thereof, it is not intended to be limited thereby but rather only to the extent set forth hereafter in the claims which follow.

The embodiments of the invention in which an exclusive property or privilege is claimed are defined as follows:

1. In an alkaline battery including a nonsintered nickel electrode of the type comprising an electrochemically active mass pressed onto a metallic substrate wherein said mass comprises principally nickel hydroxide, inert conductive particles having a diameter of less than about 10 microns distributed throughout said nickel hydroxide and a plastic binder for binding said hydroxide and said particles together, the improvement comprising:

a strongly adherent nickel electrodeposit on the surface of said substrate, said electrodeposit comprising a sufficient quantity of nickel dendrites extending into said mass between said particles as to at least double the effective surface area of said substrate in contact with said mass and so engage said mass as to anchor said mass against premature separation from said substrate while in use.

2. In an alkaline battery including a nonsintered nickel electrode of the type comprising an electrochemically active mass pressed onto a metallic substrate wherein said mass comprises principally nickel hydroxide, inert conductive particles having a diameter of less than about 10 microns distributed throughout said nickel hydroxide and a plastic binder for binding said hydroxide and said particles together, the improvement comprising:

a nickel electrodeposit on the surface of said substrate, said electrodeposit comprising a plurality of nickel dendrites strongly adherent to said surface and extending into said mass, said dendrites having (1) an aspect ratio of about 2 to about 10, (2) a population over said surface of at least about $10^4/cm^2$ but less than about $10^7/cm^2$, (3) an inter-dendrite spacing greater than said average particle diameter, and (4) an effective surface area in contact with said active mass which is at least twice said substrate surface.

* * * * *